(12) United States Patent
Carlson et al.

(10) Patent No.: US 9,813,784 B1
(45) Date of Patent: Nov. 7, 2017

(54) EXPANDED PREVIOUSLY ON SEGMENTS

(71) Applicants: A9.com, Inc., Palo Alto, CA (US);
IMDb.com, Inc., Seattle, WA (US)

(72) Inventors: Adam Carlson, Seattle, WA (US);
Jeromey Russell Goetz, Seattle, WA (US); Ashutosh Vishwas Kulkarni, Bellevue, WA (US); Douglas Ryan Gray, Redwood City, CA (US); Danny Ryan Stephens, Seattle, WA (US);
Colin Jon Taylor, Orinda, CA (US);
Ismet Zeki Yalniz, Mountain View, CA (US)

(73) Assignees: A9.com, Palo Alto, CA (US);
IMDb.com, Inc., Seattle, WA (US)

( * ) Notice: Subject to any disclaimer, the term of this patent is extended or adjusted under 35 U.S.C. 154(b) by 0 days.

(21) Appl. No.: 14/668,738

(22) Filed: Mar. 25, 2015

(51) Int. Cl.
| | |
|---|---|
| *H04N 7/173* | (2011.01) |
| *H04N 21/8549* | (2011.01) |
| *G06K 9/00* | (2006.01) |
| *G06F 17/30* | (2006.01) |
| *H04N 21/234* | (2011.01) |
| *H04N 21/44* | (2011.01) |
| *H04N 21/845* | (2011.01) |
| *H04N 21/658* | (2011.01) |
| *H04N 21/858* | (2011.01) |

(52) U.S. Cl.
CPC ... *H04N 21/8549* (2013.01); *G06F 17/30784* (2013.01); *G06K 9/00711* (2013.01); *G06K 9/00744* (2013.01); *G06K 9/00765* (2013.01); *H04N 21/23418* (2013.01); *H04N 21/44008* (2013.01); *H04N 21/6581* (2013.01); *H04N 21/8456* (2013.01); *H04N 21/858* (2013.01)

(58) Field of Classification Search
CPC .......... H04N 21/234; H04N 21/23418; H04N 21/6581; H04N 21/845; H04N 21/8456; H04N 21/8549; H04N 21/858
USPC ............................................. 725/19, 86–104
See application file for complete search history.

(56) References Cited

U.S. PATENT DOCUMENTS

| | | | | |
|---|---|---|---|---|
| 8,094,872 | B1 * | 1/2012 | Yagnik | H04N 21/23418 380/201 |
| 9,077,956 | B1 * | 7/2015 | Morgan | H04N 9/87 |
| 9,253,533 | B1 * | 2/2016 | Morgan | H04N 21/44008 |
| 2012/0072959 | A1 * | 3/2012 | Bhagavath | H04N 21/235 725/93 |
| 2014/0245151 | A1 * | 8/2014 | Carter | H04N 21/2343 715/720 |
| 2014/0267931 | A1 * | 9/2014 | Gilson | H04N 21/4126 348/734 |

* cited by examiner

*Primary Examiner* — Jeremy Duffield
(74) *Attorney, Agent, or Firm* — Weaver Austin Villeneuve & Sampson LLP (57) ABSTRACT

Techniques are described for providing functionality to allow a viewer of a television show to watch a "previously on" segment of an episode of the television show and be able to watch the scenes from prior episodes referenced in the "previously on" segment.

20 Claims, 6 Drawing Sheets

EXPANDED PREVIOUSLY ON SEGMENTS

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Some media content, such as episodes of television shows, often include a "previously on" segment at the beginning of each episode that includes a series of scenes recapping previous episodes. Unfortunately, the content in a conventional "previously on" segment may not provide sufficient relevant information for viewers having different levels of experience with the particular show.

DETAILED DESCRIPTION

This disclosure describes techniques for using a "previously on" segment having clips of scenes from prior episodes at the beginning of episodes of media content, such as an episode of a television show, to provide additional playback options for a viewer. As the "previously on" segment at the beginning of the episode is played, the viewer can be provided options to watch the scenes of the prior episodes that the clips of the "previously on" segment are referencing. For example, the viewer can press a button to watch the scene in the prior episode, and therefore, be able to dig more deeply into that particular scene to better understand the plot of the television show.

The "previously on" segments also can be used to provide a quick playback option of a television show. For example, the viewer can be provided a compact playback of an entire season of a television show by playing scenes referenced in the "previously on" segment clips. Additionally, "previously on" segments, as well as other types of data and/or content, can be used to generate visual representations showing the advancement of various plot arcs and provide a viewer with the option to watch individual scenes corresponding to the plot arcs. The "previously on" segments also can be used to identify important or particularly relevant scenes of the television series and affect the playback of the media content when the important scenes are being played. Some examples will be illustrative.

Figure 1:
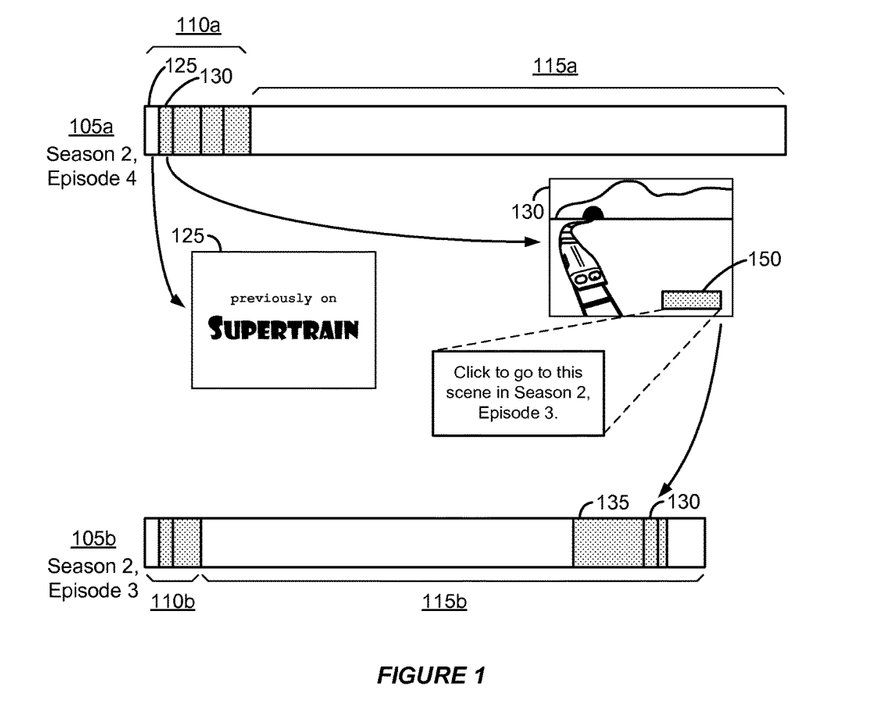
FIG. 1 illustrates an example of clips of scenes in a "previously on" segment of an episode linking to the scenes in another episode.

FIG. 1 illustrates an example of clips of scenes in a "previously on" segment of an episode linking to the scenes in another episode. As shown in FIG. 1, episode 105a (e.g., episode 4 of season 2) and episode 105b (e.g., episode 3 of season 2) are episodes of a television show with "previously on" segments 110a and 110b played prior to episode content 115a and 115b, respectively. Episode 105b is an episode that occurs prior to episode 105a in the television show.

"Previously on" segment 110a includes clips of scenes in episode content 115b of episode 105b, as well as other episodes of the television show. For example, in "previously on" segment 110a, clip 125 is an introduction clip serving as an indicator to a viewer that a series of clips of scenes from prior episodes are going to be played to bring the viewer up to speed on the current state of the plot of the television show up to episode 105a. Clip 130 in "previously on" segment 110a provides a short clip (e.g., portraying a dramatic portion) of scene 135 of episode content 115b of episode 105b. That is, the content of clip 130 in "previously on" segment 110a of episode 105a may be a shortened form of a longer scene 135 played in episode content 115b of episode 105b, for example, by including a subset of frames of scene 135 (as indicated in FIG. 1 with clip 130 being a portion of scene 135). The other clips in "previously on" segment 110a may be linked to episode 105b, as well as other episodes. Episode 105b includes "previously on" segment 110b which can provide clips of scenes from episodes occurring before episode 105b. Some overlap of clips in "previously on" segment 110a and 110b can occur if scenes of prior episodes are particularly relevant to both episodes 105a and 105b.

As a result, when a viewer watches episode 105a, "previously on" segment 110a is provided for playback. If the viewer wants to dig more deeply than the clip in "previously on" segment 110a provides, the user may jump to the corresponding scene in a different episode and watch that scene. For example, in FIG. 1, if the viewer is watching clip 130, visual indicator 150 (e.g., a button, text, etc.) may be available to the viewer, indicating that clip 130 corresponds to scene 135 in episode 105b, and the viewer may be able to further explore that aspect of the plot by watching scene 135 by selecting visual indicator 150. After scene 135 is watched, the viewer can be returned to "previously on" segment 110a and be provided the subsequent clip following clip 130. Another visual indicator 150 can be provided so that the viewer can further explore another scene corresponding to the following clip in "previously on" segment 110a. As a result, rather than being provided a series of short clips of scenes, the viewer may be able to watch the actual scenes to get more detail on the plot or story arcs of the television show.

Figure 2:
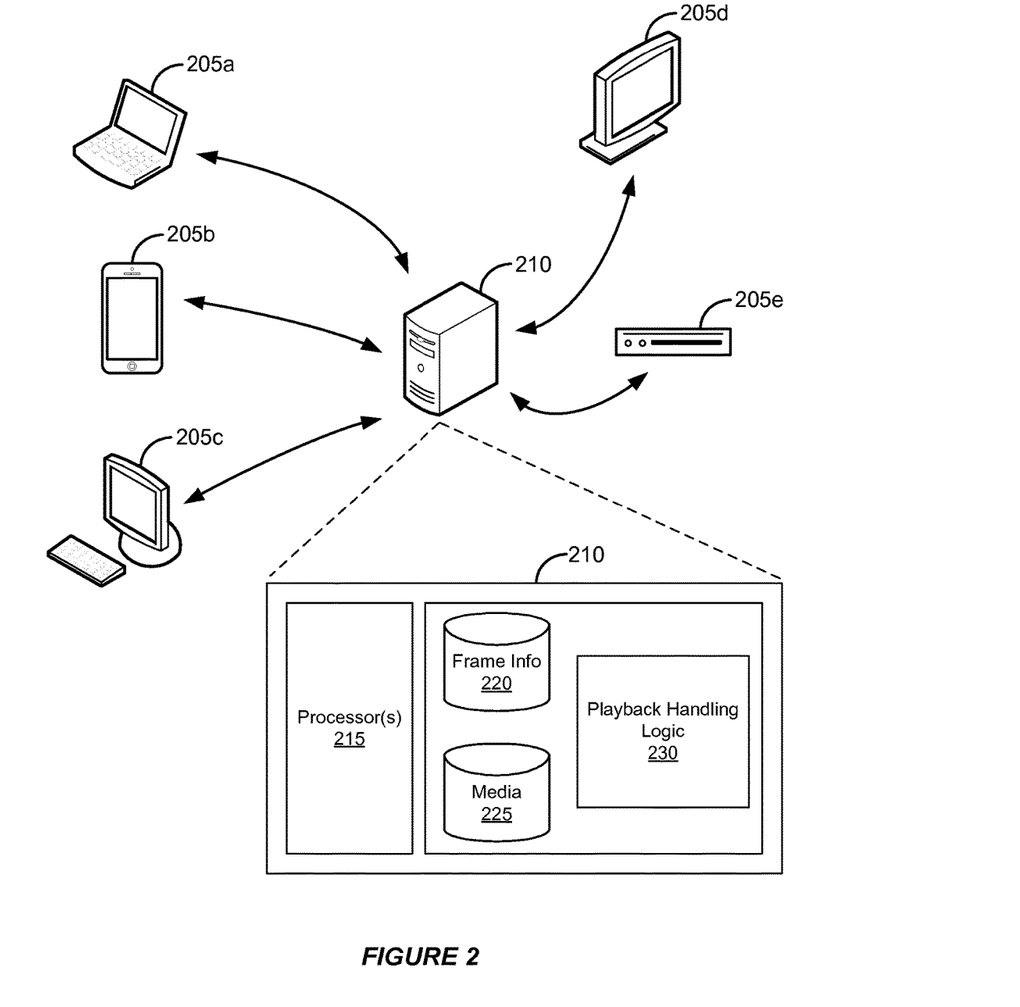
FIG. 2 illustrates an example of a computing environment for a server used to link the clips of a "previously on" segment to scenes in other episodes.

FIG. 2 illustrates an example of a computing environment for a server used to link the clips of a "previously on" segment to scenes in other episodes. The computing environment of FIG. 2 includes media server 210 which can be used to provide media content for playback on devices 205a-e.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 210 may be part of a content delivery system that conforms to any of a wide variety of architectures. The functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Media server 210 can include various types of logic used to provide media content for playback at devices 205a-e. In FIG. 2, media server 210 includes media content storage 225, frame info database 220, and playback handling logic 230. Media content storage 225 stores a variety of media content for playback on devices 205a-e, such as episodes of television shows, movies, music, etc.

Frame info 220 can be a storage mechanism, such as a database, storing "fingerprints" of frames (i.e., still images in video) of television shows. For example, frames of every episode of a television show (e.g., one or more frames from each scene in each episode of the television show) stored in media content storage 225 can be "fingerprinted" to determine a visual signature (e.g., by generating a unique hashcode based on image data of the frame) to be able to determine that a clip from a "previously on" segment (e.g., clip 130 in "previously on" segment 110a in FIG. 1) corresponds to a scene in the episode content (e.g., scene 135 in episode content 115b in FIG. 1). In some implementations, the fingerprint can be an audio signature based on the audio content being played with the frame. Since clip 130 includes frames from scene 135 (since it is a shortened version of scene 135), the visual signature or fingerprint of a frame in clip 130 can be the same or substantially similar (e.g., within a certain threshold) to a frame in scene 135, as well as unique compared to other frames. As a result, a fingerprint of a frame of clip 130 can be used to search the database of fingerprints of the frames of all of the episodes of the television show for the same (or substantially similar) fingerprint and determine the scene and/or episode it is from. In some implementations, multiple fingerprints of multiple frames can be combined to create hash-codes as well. Examples of fingerprinting frames are explained in more detail in U.S. patent application Publication Ser. No. 14/498,818, titled VIDEO CONTENT ALIGNMENT, by Yalniz et al., filed on Sep. 26, 2014, and is hereby incorporated by reference in its entirety and for all purposes. Playback handling logic 230 determines whether a viewer wants to watch a scene of a prior episode from a "previously on" segment and provides the scene to devices 205a-e. Media server 210 also can include one or more processors 215, memory, and other hardware for performing the tasks disclosed herein.

Frame info 220 also can store data indicating the frames and/or their fingerprints that are grouped together to define a scene. Each episode of a television show may be a sequence of scenes. Each frame (as indicated by its fingerprint or visual signature) can be grouped with other frames to define scenes. As a result, any frame within a clip in the "previously on" segment can be correlated with a specific scene of the episode content of an episode of a television show since the frame would also appear in the scene. Moreover, frame info 220 also can store data identifying the episode that the frame is in and the time in the episode when the frame is played. Media server 210 also can store additional data, such as the start times and end times of the scenes.

Figure 3:
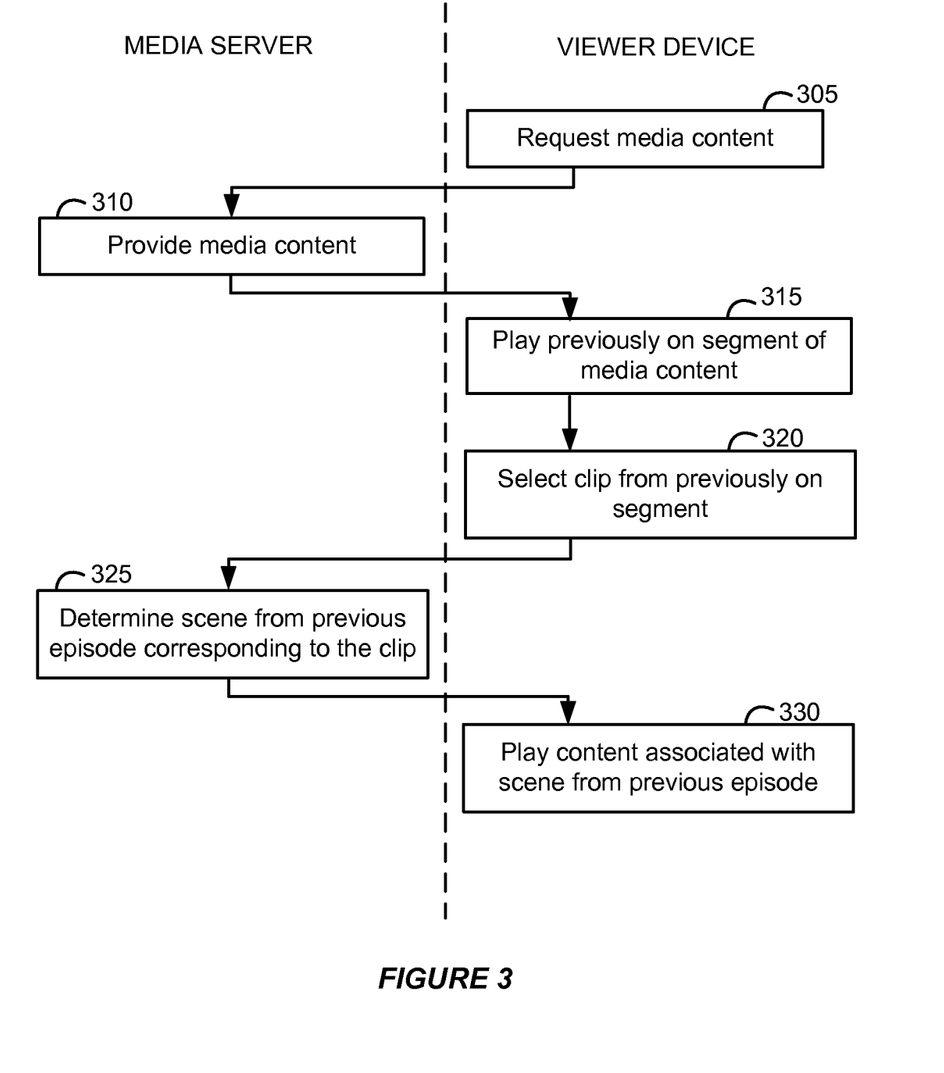
FIG. 3 is a flowchart illustrating an operation of a server used to link the clips of a "previously on" segment to scenes in other episodes.

A specific implementation will now be described with reference to the computing environment of FIG. 2 and the flow diagram of FIG. 3. In the depicted implementation, a viewer selects media content for playback on a device (e.g., one of devices 205a-e), for example, by selecting an episode of a television show for playback from a video streaming service, and therefore, request the particular episode from media server 210 (305). Media server 210 receives the request, retrieves the appropriate data from media content storage 225, and provides the episode for playback on the device (310). The episode can be provided in whole, or in parts. For example, the episode can be "streamed" from media server 210. The device begins playing back the episode, and if the episode includes a "previously on" segment, the viewer can be provided the opportunity to jump to the scene in a prior episode referenced by the clip in the "previously on" segment (315). For example, the viewer can select visual indicator 150 in FIG. 1 during the playback of the "previously on" segment to indicate that the viewer wants to go to the scene (or see other related content of the scene, such as a transcript of the dialog in the scene, the text from a portion of the screenplay detailing the scene, a textual summary of the scene, or a page or dialog box with multiple options to explore the scene) in a prior episode referenced in the clip currently being watched (320). In some implementations, visual indicator 150 may be provided based on a time range of the playback (e.g., media server 210 may know for how long the previously on segment is for the episode). In an implementation, visual indicator 150 may be provided based on fingerprinting the frames in the "previously on" segment and media server 210 determining that the fingerprint also exists in frame info 220, indicating that the frame in the "previously on" segment is also a frame in a scene in another episode. In some implementations, determining whether a "previously on" segment is included in an episode may include recognizing the words "previously on" being spoken (e.g., with speech-to-text recognition) or in text (e.g., subtitles, optical character recognition, etc.). In some implementations, a viewer may be able to select a button or other visual indicator at any time and if a "previously on" segment is being played then the features disclosed herein can be used. In some implementations, a rules-based system may be used. For example, shows categorized as 1-hour dramas are likely to include a "previously on" segment, and therefore, the features can be provided to the viewer.

As a result, media server 210 receives a request that the viewer wants to go to the scene in the prior episode and it can determine a fingerprint or visual signature of the frame of the clip and compare that fingerprint with the fingerprints in frame info 220 to determine the scene and episode that the clip corresponds to (325). For example, if the viewer selects visual indicator 150 at any time (e.g., at the beginning, in the middle, etc.) when clip 130 of "previously on" segment 110a of episode 105a in FIG. 1 is being played, the particular frame provided for playback at the device at the selection time of visual indicator 150 can be fingerprinted and compared with the existing fingerprints in frame info 220. In some implementations, another frame (or multiple frames) in the same clip may be fingerprinted. For example, a fingerprint of a first frame of clip 130 can be generated and used to search frame info 220 when visual indicator 150 is selected any time while clip 130 is played. The fingerprinting may be performed by the device or media server 210. For example, when media server 210 receives data indicating the selection of visual indicator 150, it may be able to determine the frame in the clip of the "previously on" segment that was being played back on the device and then perform the fingerprinting. In another example, the device may perform the fingerprinting and provide the corresponding data to media server 210. If the fingerprint matches a fingerprint of a frame within scene 135, then the device can be provided scene 135 (or other content, as previously discussed) of episode 105b for playback (330).

In some implementations, scene 135 may begin playback from the beginning. That is, at any time during the playback of clip 130 when visual indicator 150 is selected by the viewer, scene 135 is provided from the beginning and played in its entirety by looking up the start time of the scene in frame info 220. This may be done because the viewer may not decide to review the scene until the clip in the "previously on" segment has almost finished.

In some implementations, only a certain time period of scene 135 is played (e.g., the first 30 seconds, which can still be longer than clip 130 and provide the viewer with enough detail to catch up with the storyline. In some implementations, the time period that scene 135 is played may be adjusted based on a variety of factors. For example, the length of clip 130 (e.g., a longer clip in the "previously on" segment may allow for more of a scene to be played than a shorter clip), how far ago the episode in which the scene appears is (e.g., a clip in the "previously on" segment that references a scene from 3 episodes ago may play the scene longer than a clip referencing another scene 1 episode ago), how far the episode with the "previously on" segment is within the season, how recently the viewer has seen the episode (e.g., if the episode referenced in the "previously on" segment was just watched in a "binge-watching" session of multiple episodes, then the playback of the scene may be shorter (or not shown at all) than if the episode was watched a week ago, and if the episode was watched a year ago then the entire scene can be played back) or other factors may be used to adjust the time period.

In some implementations, scene 135 is provided for playback in the middle or other time based on when visual indicator 150 is selected during playback of clip 130. For example, the playback of scene 135 can begin from the frame that has the same (or similar) fingerprint as the frame from clip 130 that is currently being played when visual indicator 150 is selected.

After the scene from the prior episode is finished (as indicated by the data regarding the end times of scenes stored by media server 210), the next clip in the "previously on" segment can be played so that the viewer returns to the "previously on" segment. In some implementations, the viewer may select to return to the next clip in the "previously on" segment, for example, by selecting a "back" button to return. If the viewer does not select to return to the next clip in the "previously on" segment, then the next scene in the prior episode may be played back so that the viewer can watch more of the prior episode.

The "previously on" segments of episodes also can be used for further playback options to enhance a viewer's experience. For example, in some scenarios, a viewer may want to watch the second season of a television show, but might not remember important details from the first season. The viewer might want to be able to quickly watch important scenes of the first season before watching the first episode of the second season. Generally, the scenes referenced in the clips in the "previously on" segments are the more important points in the storyline. Therefore, a quick summary of the entire season can be based on all of the referenced scenes in the "previously on" segments.

Figure 4:
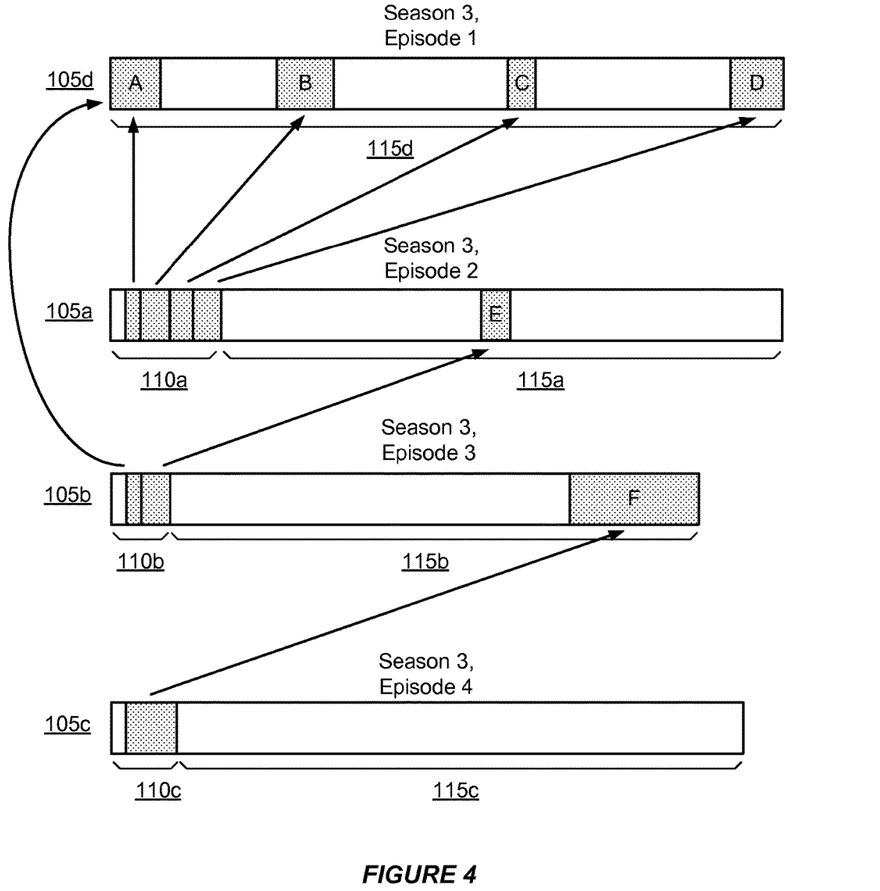
FIG. 4 illustrates an example of a playback of scenes corresponding to clips from "previously on" segments.

FIG. 4 illustrates an example of a playback of scenes corresponding to clips from "previously on" segments. The example in FIG. 4 can be used to provide a quick playback of a collection of episodes, for example an entire season of a show, by determining the scenes referenced in the clips of the "previously on" segments and playing back those scenes to provide a shortened version of the entire season.

In FIG. 4, episode 105d is the first episode of the season (e.g., episode 1 of season 3), episode 105a is the second episode, episode 105b is the third episode, and episode 105c is the fourth episode. In FIG. 4, "previously on" segments 110a-c of episodes 105a-c are fingerprinted by media server 210 to determine a sequence of scenes over the season to provide a quick summary of the entire season's storyline. Episode 105d does not include a "previously on" segment because it is the first episode of the season and series. However, in some implementations, it may include a "previously on" segment (e.g., the first episode of the third season might include a previously on segment with clips from scenes of the second season), but its "previously on" segment would not be used to determine relevant scenes because they are not in the season of interest. The arrows from clips in "previously on" segments 110a-c to scenes in episode content 115a, b, and d indicate that the clip references the indicated scene (i.e., they include similar or same frames).

In FIG. 4, starting with the second episode (i.e., episode 105a), "previously on" segment 110a can be fingerprinted to determine scenes in episode 105d that should be provided for playback. For example, the first clip in "previously on" segment 110a may correspond with the first highlighted scene A in episode content 115d of episode 105d, the second clip in "previously on" segment 110a may correspond with the second highlighted scene B in episode content 115d, and so on. Next, "previously on" segment 110b may be fingerprinted to determine the scenes for playback. If any of the scenes are the scenes that were previously played back (because clips in "previously on" segment 110b and "previously on" segment 110a may reference the same scene), then that scene may be skipped. For example, the first clip in "previously on" segment 110b corresponds to the first scene A in episode content 115d, and therefore, can be ignored because the scene is already referenced by the first clip in "previously on" content 110a of episode 105a. As a result, scenes from episode 105a and episode 105d referenced in "previously on" segment 110b are played back. A similar process can repeat with "previously on" segment 110c of episode 105c such that the viewer is provided a series of scenes based on the scenes referenced in the "previously on" segments 110a-c of episodes 105a-c. As a result, the scenes labeled A, B, C, D, E, and F can be played back in that order. In some implementations, scenes from episode 105c can be selected for playback if the clips in the "previously on" segment of the first episode of the following season references those scenes.

Media server 210 can determine the scenes to be played back when the viewer selects an option to review a summary of the season. For example, the viewer may be able to start the first episode of season two and be provided an indication that a summary of season one is available and be able to playback the summary. In another example, the viewer may navigate a webpage, app, or other resource with an informational section for the television show and select an option to view a season summary. Media server 210 can determine the scenes to be played back beforehand (e.g., by processing episodes 105*a*-*d* to determine what scenes will be included in the season summary) or determine the scenes for playback when the user requests a season summary for playback.

Though the above example uses summaries of seasons of television shows, other collections of episodes can be used. For example, the viewer can select a range of episodes (in one season or across multiple seasons) for the summary. As a result, only the scenes in the range of episodes would be played back though all of the "previously on" segments of the episodes in the season (or multiple seasons) can be used to determine the relevant episodes for the particular range of episodes.

In some implementations, scenes from episodes from more than one season of the television show, scenes from episodes from other television shows (e.g., television shows with crossover episodes featuring characters from different television shows), etc. can be referenced in "previously on" segments and the corresponding scenes from those episodes can also be used in the playback.

Figure 5:
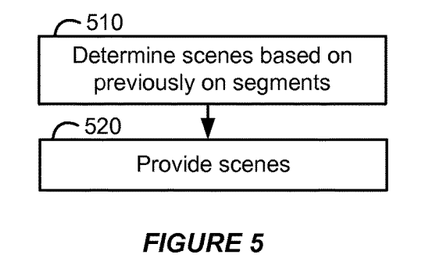
FIG. 5 illustrates a flowchart of a playback of scenes corresponding to clips from "previously on" segments.

FIG. 5 illustrates a flowchart of a playback of scenes corresponding to clips from "previously on" segments. In FIG. 5, scenes to be played back can be determined (e.g., with the fingerprinting, as previously discussed) based on clips referencing the scenes in the "previously on" segments (510). After the scenes are identified, the scenes can be provided to the device for playback (520). As a result, the playback can provide a quick summary by playing the scenes referenced in the "previously on" clips.

The "previously on" segments of episodes also can be used for other playback options to enhance a viewer's experience. In some scenarios, the "previously on" segments can be used to identify important or particularly relevant scenes of the television series and be used to affect the playback of the media content when the important scenes are being played. For example, a viewer might want to watch an episode of a television show a little faster than normal by increasing the playback speed (e.g., play the episode at 1.5× the normal speed) so that an episode can be played in a shorter amount of time. If a scene in the episode is referenced in a clip in a "previously on" segment (e.g, in a "previously on" segment of a future episode), it might be an important or relevant scene to understand the storyline, and therefore, the playback speed might be reduced (e.g., back to the normal speed) during that scene. After the scene is finished (as indicated in the data regarding the end times of scenes in media server 210), playback speed can be increased (e.g., back to 1.5× the normal speed) until another scene referenced in a "previously on" segment.

Figure 6:
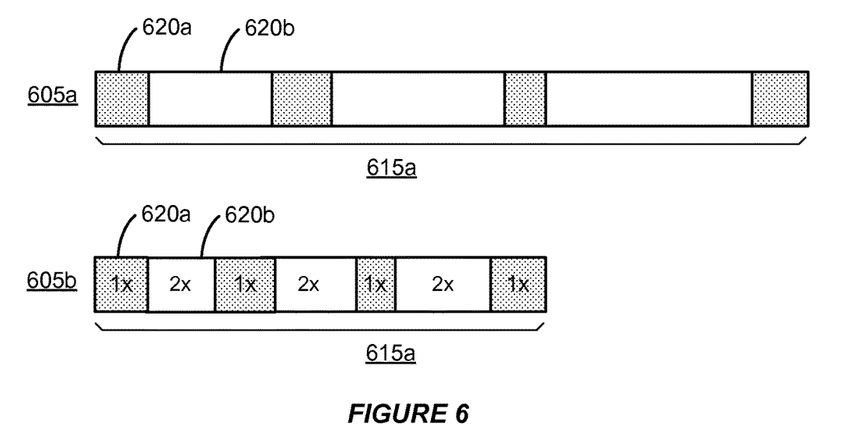
FIG. 6 illustrates an example of adjusting the playback of media content based on the "previously on" segments.

FIG. 6 illustrates an example of adjusting the playback of media content based on the "previously on" segments. In FIG. 6, episode 605*a* is an episode with no adjustment affecting the playback of the media content. As a result, scene 620*a* (i.e., a scene that is referenced in a clip in a "previously on" segment of a later episode) and scene 620 (i.e., a scene that is not referenced in a clip in a "previously on" segment) in episodic content 615*a* are both played at 1.0× speed. Episode 605*b* is the same episode as episode 605*a*, but with the playback affected based on whether the scenes are referenced in clips of "previously on" segments. For episode 605*b*, since scene 620*a* is referenced in a clip in a "previously on" segment, it is played at the normal speed. However, since scene 620*b* is not referenced in a "previously on" segment, it is played at twice the normal speed. As a result, episodic content 615*a* in episode 605*b* can provide the same episodic content 615*a* as episode 605*a*, but at a much faster playback.

Figure 7:
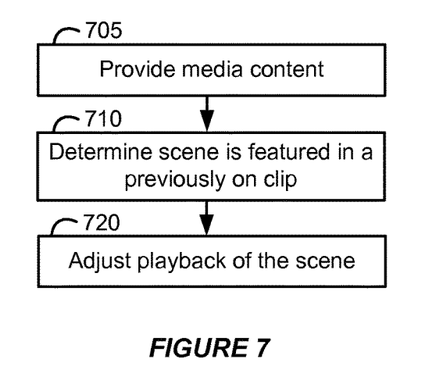
FIG. 7 illustrates a flowchart of adjusting the playback of media content based on the "previously on" segments.

FIG. 7 illustrates a flowchart of adjusting the playback of media content based on the "previously on" segments. In FIG. 7, media content such as an episode of a television show can be provided to a device (705). As the episode is played back, fingerprints of the frames can be determined if they correspond to scenes referenced in clips in "previously on" segments of episodes of the television show (710). For example, the fingerprints can be compared with existing fingerprints in frame info 220, which can include fingerprints of frames in the "previously on" segments. That is, frames from clips of the "previously on" segments can be fingerprinted and the corresponding visual signature data stored in frame info 220. The fingerprints of the frames from clips can also be correlated with scenes of episodes such that the speed of the playback can be adjusted (715).

In some implementations, the playback can be adjusted in other ways. For example, a message, graphic, or other indicator can let the viewer know that the scene is important and the user can then select the indicator to play the scene at the slower speed. In some implementations, the volume of scenes can be adjusted (e.g., increasing the volume during scenes identified as being in "previously on" segments).

In some implementations, the clips in the "previously on" segments can be supplemented with additional clips determined to be relevant to the episode to be played. Moreover, some television shows lack a "previously on" segment, and therefore, a "previously on" segment can be generated.

For example, some episodes include "establishing shots" at the beginning of episodes to provide the viewer with context of the scene by showing one or more frames of a setting. One example of an establishing shot may be a frame (or multiple frames) showing a castle. When scenes occur in the castle, the establishing shot may be first shown, followed by the rest of the scene (e.g., a Queen presiding over a court). As a result, multiple scenes across multiple episodes may be linked by the establishing shots. If the current episode to be played includes establishing shots in prior episodes, then the scenes including the establishing shots in the prior episodes can be used to generate a "previously on" segment or add additional clips to an existing "previously on" segment. For example, the first 30 seconds of scenes having the same establishing shot in the prior two episodes before the current episode can be used as a generated "previously on" segment.

Figure 8A:
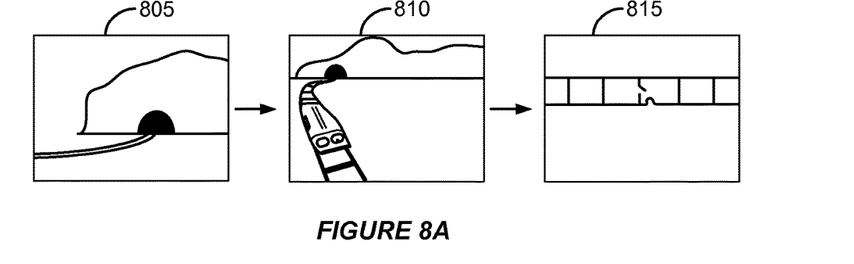
FIG. 8A illustrates an example of a visual representation of a plot arc.

Additionally, "previously on" segments can be used to generate visual representations showing the advancement of various plot arcs and provide a viewer with the option to watch individual scenes corresponding to the plot arcs. For example, the viewer may be able to navigate to a "details page" of a television show and be able to see scenes of the plot arcs in a visual representation. FIG. 8A illustrates an example of a visual representation of a plot arc. In FIG. 8A, scenes 805, 810, and 815 may be identified as scenes corresponding to clips in "previously on" segments of a season of a television show. For example, scene 805 (e.g., approaching a tunnel) may be from season 1, episode 1; scene 810 (e.g., a train leaving the tunnel) may be from season 1, episode 4; and scene 815 (e.g., a broken railroad track) may be from season 1, episode 8. The scenes may all relate to the same plot arc. The viewer can indicate one of scenes 805, 810, or 815 to watch (e.g., by clicking on a still image of the first frame of the scene, a text link, a button, etc.).

Multiple plot arc visualizations can be generated from the scenes referenced by clips in the "previously on" segments. For example, visualizations can be generated by identifying that the scenes share a locale or setting (e.g., by determining that the scenes include establishing shots, as previously discussed), characters, or other characteristics.

Figure 8B:
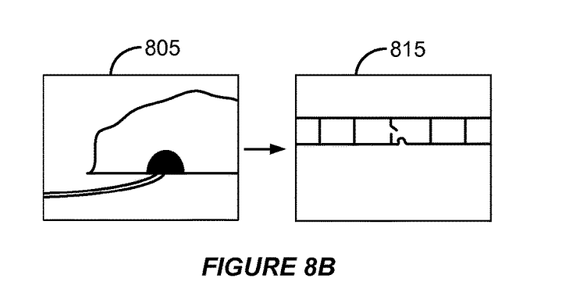
FIG. 8B and FIG. 8C illustrate examples of modifications of a visual representation of a plot arc.

Interactions of viewers with the scenes in the plot arc visual representations can be used to modify (e.g., delete or add) scenes. FIG. 8B illustrates an example of a modification of a visual representation of a plot arc. In FIG. 8B, scene 810 may be deleted because viewers are determined to watch scene 805 followed by scene 815 and skipping scene 810. As a result, by counting how often scenes are viewed, a scene can be removed from the visual representation (e.g., if its view count is below a threshold, if its view count is below a threshold difference between its view count and the view counts from the scenes before and/or after it, etc.), and therefore, the plot arc can be shortened.

Figure 8C:
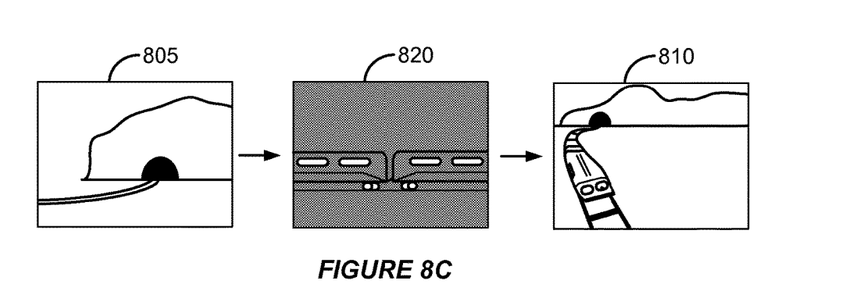

FIG. 8C illustrates another modification of a visual representation of a plot arc. In FIG. 8C, a scene may be added to the visual representation. For example, scene 820 in FIG. 8C is added between scene 805 and scene 810 to include a new scene in the visual representation. Scene 820 may be added because viewers may select scene 805 to watch, and then they may continue watching scene 810, for example, by selecting a button (or other indicator) to continue to the next scene, which happens to be scene 820 or merely letting the playback automatically transition from scene 805 to scene 820. Similar to the example of FIG. 8B, how often scene 820 is played can be counted and scene 820 can then be added to the visual representation between the scenes before and afterwards (i.e., scenes 805 and 810, respectively) if the count is above a threshold. In some implementations, the threshold can be based on how often scenes 805 and 810 themselves are played. For example, scene 820 can be added to the visual representation if it is played 90% as often as scenes 805 or 810.

In some implementations, viewers can vote on scenes and the voting data may indicate whether scenes should be added or removed from the visual representation. For example, viewers can "like" or "dislike" a scene. If a scene has a certain ratio of likes-to-dislikes, then it may be added or removed. Viewers also can give scenes a score (e.g., from 1 to 10) and a scene with an average score above 5 may be included in the visual representation while scenes below 5 may be removed from the visual representation. In some implementations, the scene referenced by clips in "previously on" segments may be displayed regardless of voting, but new scenes that are not referenced in the clips may be added or removed based on the voting.

Additionally, user data can be used to add or delete scenes from the visual representation in FIG. 8A. If a viewer reaches the visual representation, or other type of resource for the television show, based on a recommendation from another television show, types of story lines or scenes can be added. For example, if a viewer is watching a television show about castles and is provided a recommendation for another television show, scenes taking place in castles can be added to a plot arc in the visual representation, or a whole new plot arc (i.e., series of scenes) can be added. The user's preferences (e.g., the types of shows they prefer to watch, favorite actors, etc.) also can be used to modify the plot arcs in the visual representation.

Though many of the examples described herein use episodes of television shows, other types of media content can be used. For example, movie series (e.g., a trilogy of movies, movies in a franchise such as the James Bond series, etc.) can also include segments similar to the "previously on" segments that reference prior movies. As another example, media content can be the library, or collection, of Rocky movies featuring Rocky Balboa. Latter episodes (i.e., latter Rocky movies) can include clips of prior episodes (i.e., earlier Rocky movies) that can be "previously on" segments and the techniques disclosed herein can also be used.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method, comprising:
   receiving, by a media server, a request from a client device for an episode of a show;
   streaming, by the media server, the episode to the client device, the episode having a portion providing a series of clips of scenes of prior episodes;
   receiving, by the media server, a request from the client device to provide a scene of one of the prior episodes corresponding to a clip in the series of clips;
   determining, by the media server, a fingerprint representative of one or more frames of the clip in the series of clips;
   searching, by the media server, a database of fingerprints representative of one or more frames of scenes of episodes of the show for a scene having one or more frames associated with a fingerprint matching the fingerprint representative of the one or more frames of the clip;
   determining, by the media server, a start time of playback of the scene in relation to playback of the episode of the show, the start time of the playback of the scene occurring before a playback time corresponding to the one or more frames of the scene that are associated with the fingerprint matching the fingerprint representative of the one or more frames of the clip;
   streaming, by the media server, the scene of the prior episode to the client device for playback, the streaming beginning from the start time of the scene, wherein a time duration of the playback of the scene of the prior episode is based on a time duration of the clip in the series of clips referencing the scene.

2. The method of claim 1, wherein frames of the clip are a subset of frames of the scene.

3. The method of claim 1, further comprising:
   determining, by the media server, a playback of the scene of the prior episode is finished; and streaming, by the media server, another clip from the portion providing a series of clips of scenes of prior episodes to the client device responsive to the determination that the playback of the scene is finished.

4. The method of claim 1, wherein the database of fingerprints includes a fingerprint of at least one frame of each scene of each episode of the show.

5. A computing device, comprising:
one or more processors and memory configured to:
determine that a first fingerprint representing one or more frames of a recap sequence of media content corresponds to a second fingerprint representing one or more frames of a scene of the media content;
determine a start time of playback of the scene in relation to playback of the media content, the start time of the playback of the scene occurring before a playback time corresponding to the one or more frames of the scene corresponding to the second fingerprint in relation to the playback of the media content, and
provide the scene of the media content to a user device for playback from the start time of the scene based on the determination that the first fingerprint representing one or more frames of the recap sequence corresponds to the second fingerprint representing one or more frames of the scene of the media content, wherein a time duration of the playback of the scene is based on a time duration of a portion of the recap sequence referencing the scene.

6. The computing device of claim 5, wherein the first fingerprint and the second fingerprint each indicate visual signatures of the corresponding frames.

7. The computing device of claim 6, wherein the visual signature of the first fingerprint matches the visual signature of the second fingerprint.

8. The computing device of claim 5, wherein determining that the first fingerprint corresponds to the second fingerprint includes searching a database of fingerprints of frames of the media content for similarities between the first fingerprint and the second fingerprint.

9. The computing device of claim 8, wherein the database of fingerprints of frames includes one fingerprint for at least one frame of each scene of each episode of the media content.

10. The computing device of claim 5, wherein the recap sequence includes a series of clips of scenes of prior episodes of the media content.

11. The computing device of claim 10, the one or more processors and memory are further configured to:
generate a visual indicator indicating that a clip in the series of clips corresponds to a scene in the prior episodes of the media content.

12. The computing device of claim 11, wherein the scene of the episode of the media content is provided to the user device based on a selection of the visual indicator.

13. A computer program product, comprising one or more non-transitory computer-readable media having computer program instructions stored therein, the computer program instructions being configured such that, when executed by one or more computing devices, the computer program instructions cause the one or more computing devices to:
determine that a first fingerprint representing one or more frames of a recap sequence of media content corresponds to a second fingerprint representing one or more frames of a scene of the media content;
determine a start time of playback of the scene in relation to playback of the media content, the start time of the playback of the scene occurring before a playback time corresponding to the one or more frames of the scene corresponding to the second fingerprint in relation to the playback of the media content, and
provide the scene of the media content to a user device for playback from the start time of the scene based on the determination that the first fingerprint of the frame of the recap sequence corresponds to the second fingerprint of the frame of the scene of the media content, wherein a time duration of the playback of the scene is based on a time duration of a portion of the recap sequence referencing the scene.

14. The computer program product of claim 13, wherein the first fingerprint and the second fingerprint each indicate visual signatures of the corresponding frames.

15. The computer program product of claim 13, wherein the visual signature of the first fingerprint matches the visual signature of the second fingerprint.

16. The computer program product of claim 13, wherein determining that the first fingerprint corresponds to the second fingerprint includes searching a database of fingerprints of frames of the media content for similarities between the first fingerprint and the second fingerprint.

17. The computer program product of claim 16, wherein the database of fingerprints of frames includes one fingerprint for at least one frame of each scene of each episode of the media content.

18. The computer program product of claim 13, wherein the recap sequence includes a series of clips of scenes of prior episodes of the media content.

19. The computer program product of claim 18, wherein the computer program instructions are further configured to cause the one or more computing devices to:
generate a visual indicator indicating that a clip in the series of clips corresponds to a scene in the prior episodes of the media content.

20. The computer program product of claim 19, wherein the scene of the episode of the media content is provided to the user device based on a selection of the visual indicator.

* * * * *